(12) United States Patent
Sojourner et al.

(10) Patent No.: US 6,750,939 B2
(45) Date of Patent: Jun. 15, 2004

(54) SYSTEM AND METHOD FOR MANUFACTURING LIQUID CRYSTAL MICRO DISPLAYS

(75) Inventors: Douglas Sojourner, Union City, CA (US); Ken A. Nishimura, Fremont, CA (US); Charles D. Hoke, Palo Alto, CA (US); Barry Bronson, Saratoga, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 80 days.

(21) Appl. No.: 09/842,100

(22) Filed: Apr. 25, 2001

(65) Prior Publication Data

US 2002/0159020 A1 Oct. 31, 2002

(51) Int. Cl.⁷ .................... G02F 1/1341; G02F 1/13; G01R 31/26; H01L 21/66; H01L 21/00
(52) U.S. Cl. .................... 349/189; 349/73; 349/74; 349/113; 349/187; 438/15; 438/28
(58) Field of Search .................... 349/73, 74, 187, 349/189, 113, 190, 154; 438/28, 30, 15

(56) References Cited

U.S. PATENT DOCUMENTS

| | | | | | |
|---|---|---|---|---|---|
| 6,005,649 | A | * | 12/1999 | Krusius et al. | 349/73 |
| 6,177,288 | B1 | * | 1/2001 | Takiar | 438/15 |
| 6,275,277 | B1 | * | 8/2001 | Walker et al. | 349/113 |
| 6,445,436 | B1 | * | 9/2002 | Matsumoto | 349/153 |
| 6,476,886 | B2 | * | 11/2002 | Krusius et al. | 349/73 |
| 6,555,408 | B1 | * | 4/2003 | Jacobsen et al. | 438/28 |
| 6,556,261 | B1 | * | 4/2003 | Krusius et al. | 349/73 |
| 6,562,640 | B1 | * | 5/2003 | Tseng et al. | 438/15 |
| 6,567,138 | B1 | * | 5/2003 | Krusius et al. | 349/73 |
| 6,639,646 | B2 | * | 10/2003 | Lim | 349/187 |

FOREIGN PATENT DOCUMENTS

JP  10260415 A  * 9/1998  ......... G02F/1/1341

OTHER PUBLICATIONS

Patent Abstracts of Japan, Kitamura Hiroya, filed Sep. 29, 1998, 6 pages.

* cited by examiner

*Primary Examiner*—Robert H. Kim
*Assistant Examiner*—Jeanne Andrea Di Grazio

(57) ABSTRACT

A liquid crystal micro display (lcmd) is manufactured by creating a hole in an lcmd surface, filling the lcmd with liquid crystal material through the hole, and then sealing the hole. The invention allows an lcmd to be tested before it is separated from other lcmds and packaged. As a result, the invention increases the yield and reduces the cost associated with lcmd manufacturing.

18 Claims, 6 Drawing Sheets

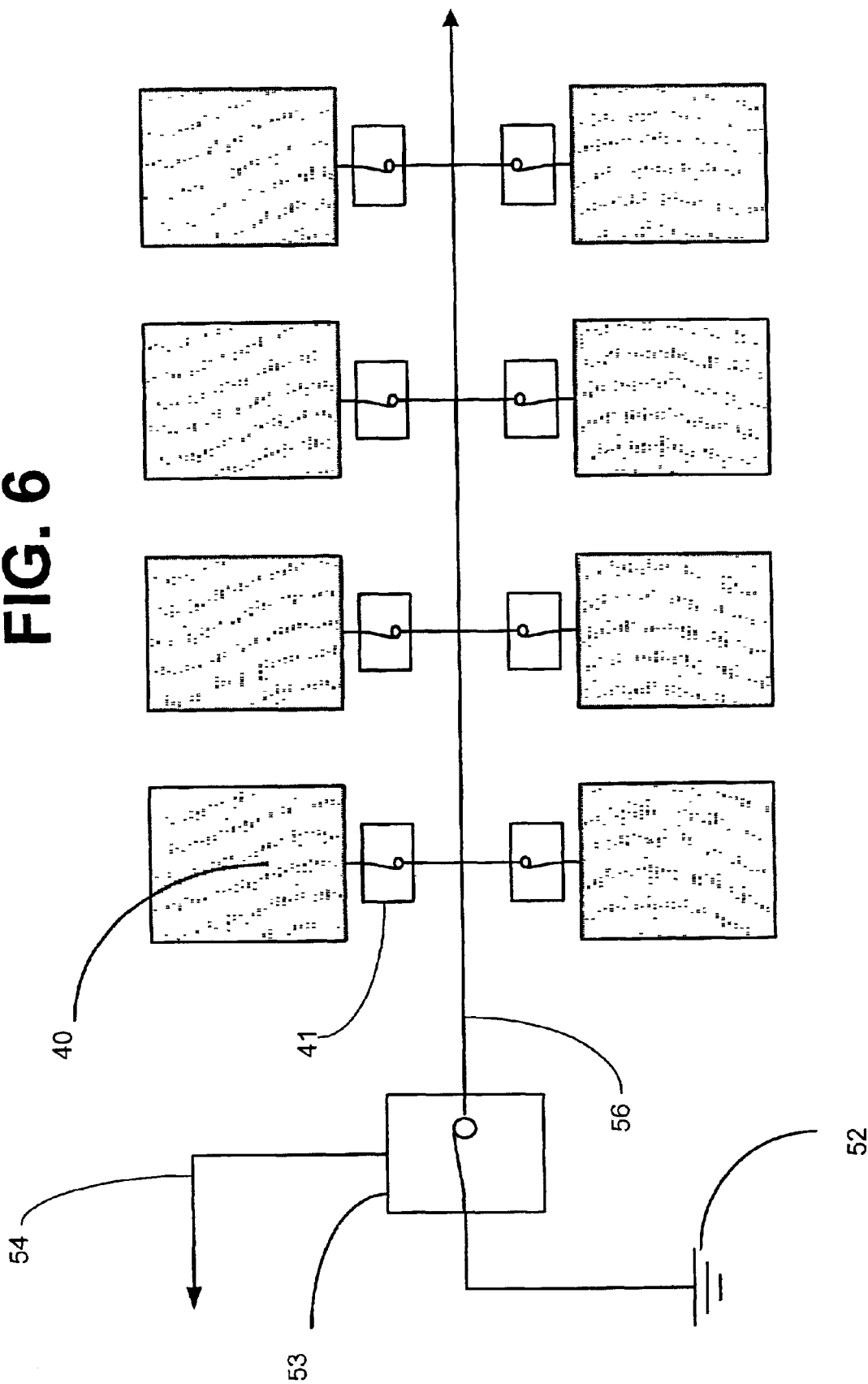

SYSTEM AND METHOD FOR MANUFACTURING LIQUID CRYSTAL MICRO DISPLAYS

TECHNICAL FIELD OF THE INVENTION

The present invention relates to a method for testing and filling semiconductor based liquid crystal displays, also known as liquid crystal micro displays ("lcmds").

BACKGROUND OF THE INVENTION

Lcmds are small liquid crystal displays that usually have a display area less than 1 square cm and a thickness of about 1 mm. They are primarily used as view finders in devices such as cameras but are also used as part of a larger display component wherein the image from the lcmd is projected or magnified. Each lcmd typically comprises hundreds of thousands of pixels but some can contain over a million.

Lcmd manufacturing is typically performed in a clean room environment wherein steps are taken to remove dust and other contaminating agents from the surrounding atmosphere. The degree to which a manufacturing environment is kept clean depends on factors such as the size and density of the integrated circuits contained in the lcmds, the desired quality of the lcmds, and the costs associated with maintaining different levels of cleanliness. Statistical models may be used to conduct a cost-benefit analysis for determining an ideal level of cleanliness for manufacturing lcmds of a certain type, size, and quality.

With reference to FIGS. 1 & 2 (prior art), each batch of lcmds is typically made from two substrates. Usually, one substrate is a semiconductor layer, such as a silicon wafer 9, containing many integrated circuits ("ICs") 12. Although, for illustration purposes, FIG. 1 shows that the silicon wafer 9 contains only nine ICs 12, each silicon wafer 9 typically contains hundreds of ICs 12 arranged in rows and columns. Each IC 12 includes an array of pixels comprising IC electrodes 16 driven via corresponding switching elements 17. The other substrate is typically a glass wafer 10 that has thereon one transparent electrode 15 per corresponding IC 12. Each substrate is typically, but not necessarily, less than 1 mm thick; the thickness of each substrate may vary according to the manner in which the lcmds are to be used.

A sealant that forms lcmd wall 11 is applied to one of the substrates. Traditionally, the wall 11 does not completely surround each IC 12—a small gap 13 remains through which the liquid crystal material flows to fill the lcmds. The silicon wafer 9 is then aligned and joined with the glass wafer 10 such that the transparent electrodes 15 are aligned with the corresponding ICs 12. Spacers (not shown) are used to keep the substrates separated by a small distance which is typically on the order of a few micrometers. The spacers may, for example, be etched onto the silicon wafer. After the substrates are joined, lcmds 8 are formed, each containing an IC 12.

Since the distance between the silicon wafer 9 and the glass wafer 10 is on the order of microns, viscosity limitations may make it impossible for liquid crystal material to reach many, if not most, of the inner lcmds 8 prior to their separation. Therefore, the lcmds 8 are filled with liquid crystal material via openings 13 after they are separated.

The lcmds 8 may be separated from each other by using, for example, a scribe and break process. In a scribe and break process, the semiconductor wafer 9 is scribed (typically with a specialized saw or laser) along scribe lines 14, in order to weaken the locations where the separation is to take place. In addition, the glass wafer 10 is scribed using a cutting tool such as a laser or a specially designed saw. The wafers 9 & 10 are typically then temporarily glued onto a flexible material that is then flexed in order to break up the wafers and separate the lcmds. The scribe and break process results in small debris of semiconductor and glass material that accumulate around lcmd openings 13.

After the lcmds are separated, they are filled with liquid crystal material. The filling is preferably achieved in a vacuum unit in which the lcmds are immersed in liquid crystal material. After an lcmd 8 is filled, the hole 13 through which it is filled is then sealed with a glue or epoxy material.

The traditional filling process described above often results in a large number of defective lcmds because debris from the scribe and break process are frequently pulled into many of the lcmds 8 by the in-flowing liquid crystal material. The debris may cause an electronic malfunction or may distort an image by blocking or altering the path of the electromagnetic radiation controlled by the lcmd. The defects caused by the debris are not discovered until after the lcmds are packaged since the packaging provides the wiring through which the lcmd receives imaging and testing signals.

Packaging an lcmd involves mounting and wiring. The lcmd is mounted into/onto a packaging unit at a predetermined angle and location so that the image produced is properly focused and aligned. The lcmd is also wired to terminals on the packaging unit. These terminals will eventually be connected to and will receive imaging and other signals from a host device, such as, for example, a camera. The area surrounding the wiring connections is typically filled with a glue or epoxy material that stabilizes the connections and prevents the wires from touching each other.

After the lcmds are packaged, they are tested so that defective units may be detected and eliminated. The testing can be difficult and costly since each individual lcmd must be tested separately. The reason that the lcmds cannot be tested while they are still part of a substrate assembly is because the testing must take place after the liquid crystal filling process (which has traditionally needed to be performed after the separation of the lcmds 8 due to viscosity limitations). The packaging process is relatively expensive and may account for most of the cost of a finished lcmd. Packaging the lcmds prior to testing significantly increases the cost associated with defective units since such cost would also include the cost of packaging.

Based on the foregoing, there exists a need for a system and method of manufacturing and testing lcmds that result in a higher yield and lower costs.

SUMMARY OF THE INVENTION

A liquid crystal micro display (lcmd) is manufactured by creating a hole in an lcmd surface, filling the lcmd with liquid crystal material through the hole, and then sealing the hole. The invention allows an lcmd to be tested before it is separated from other lcmds and packaged. As a result, the invention increases the yield and reduces the cost associated with lcmd manufacturing.

BRIEF DESCRIPTION OF THE DRAWINGS

FIG. 6 depicts a step for testing an lcmd in accordance with an embodiment of the present invention.

DETAILED DESCRIPTION OF THE INVENTION

Figure 1:
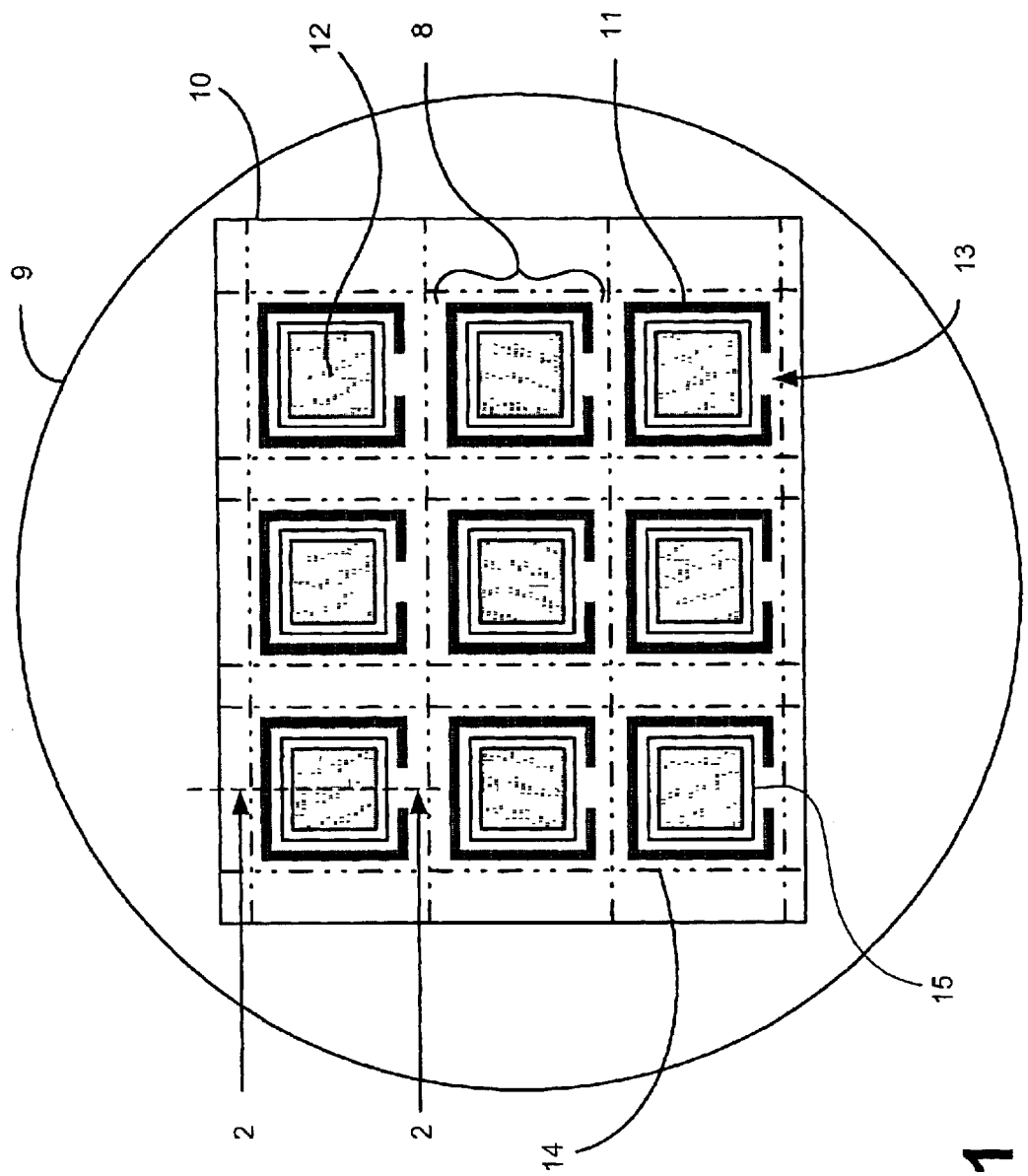
FIG. 1 depicts an example top view of a prior art lcmd substrate assembly.
Figure 2:
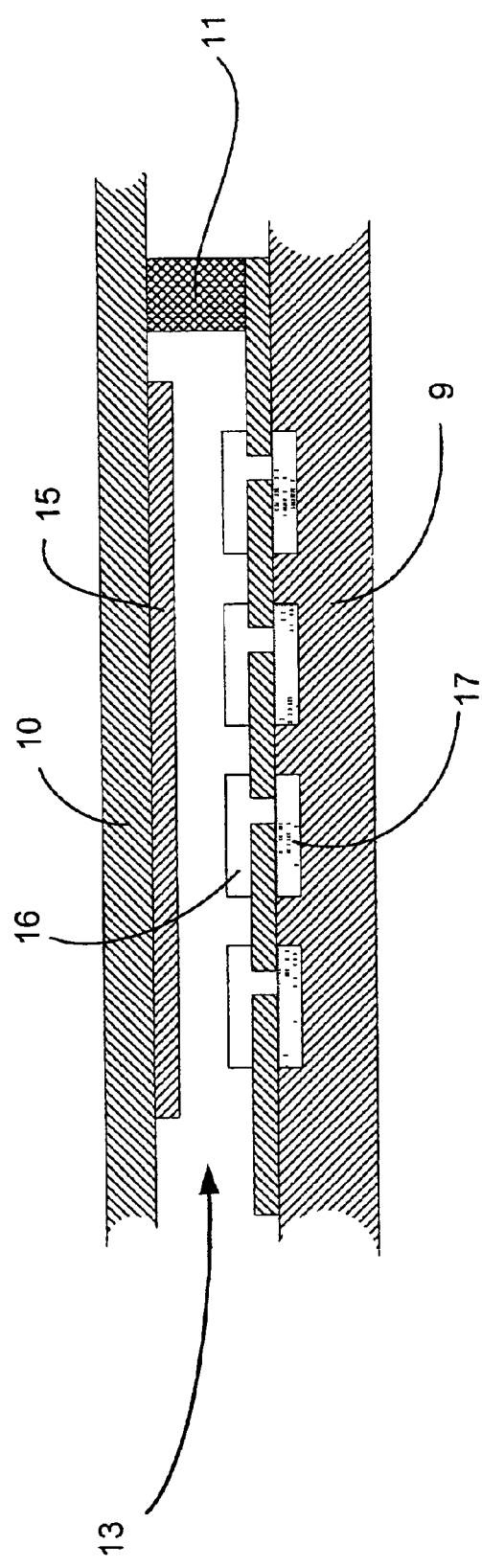
FIG. 2 depicts a cross sectional view of a prior art lcmd depicted in FIG. 1.
Figure 3:
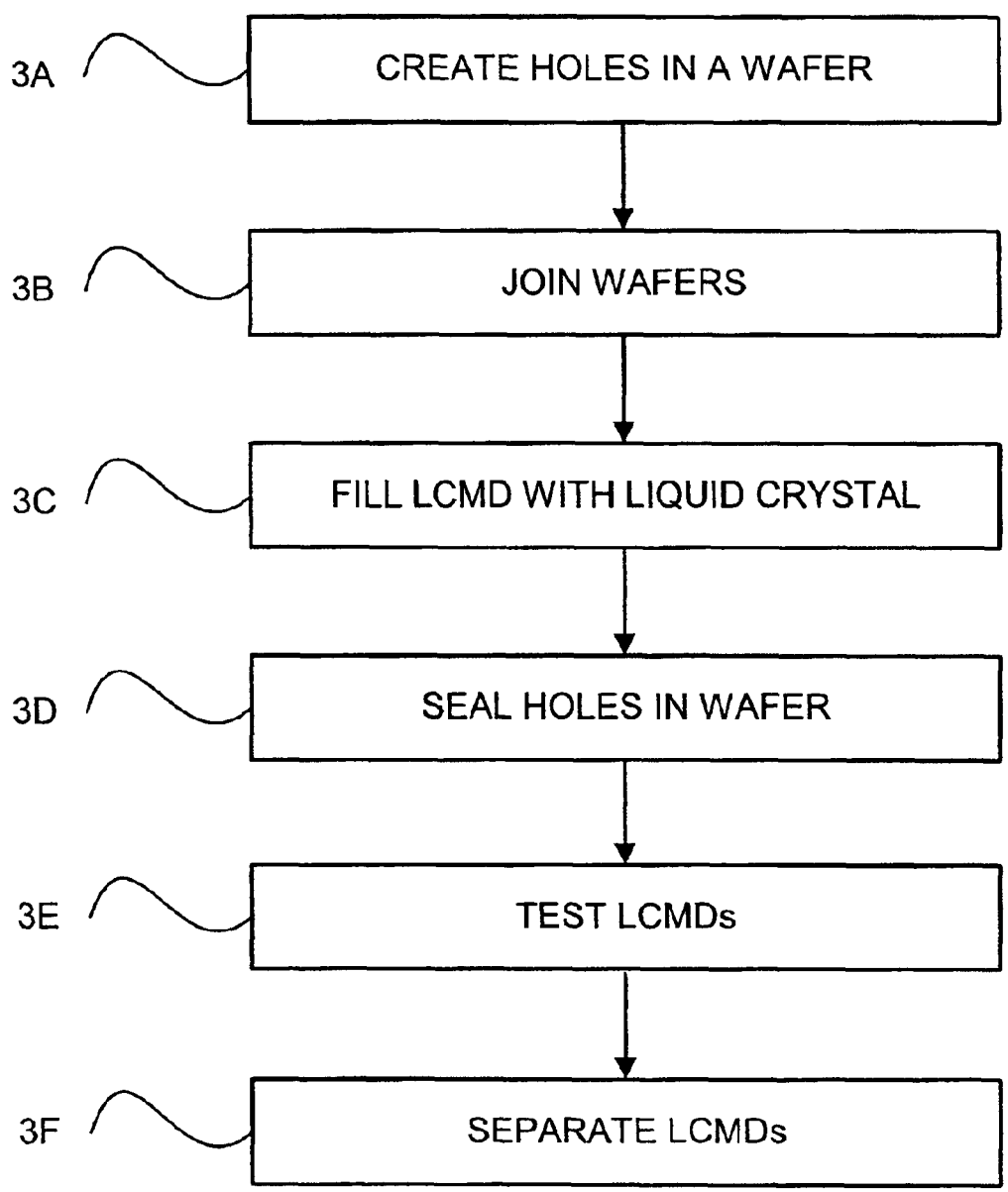
FIG. 3 depicts a flow chart illustrating a method of manufacturing lcmds of the present invention.
Figure 4:
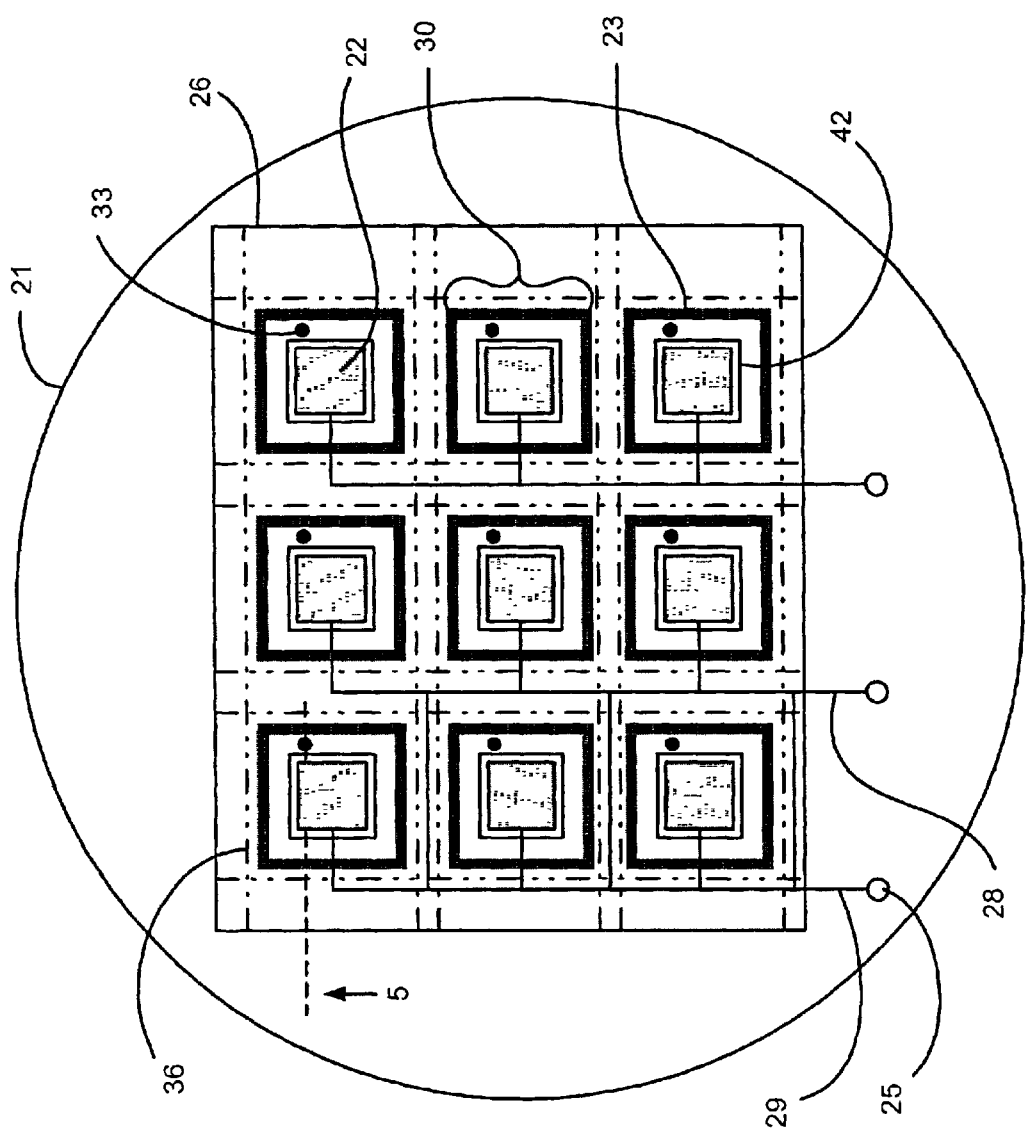
FIG. 4 depicts an example top view of an lcmd substrate assembly used in the method illustrated in FIG. 3.
Figure 5:
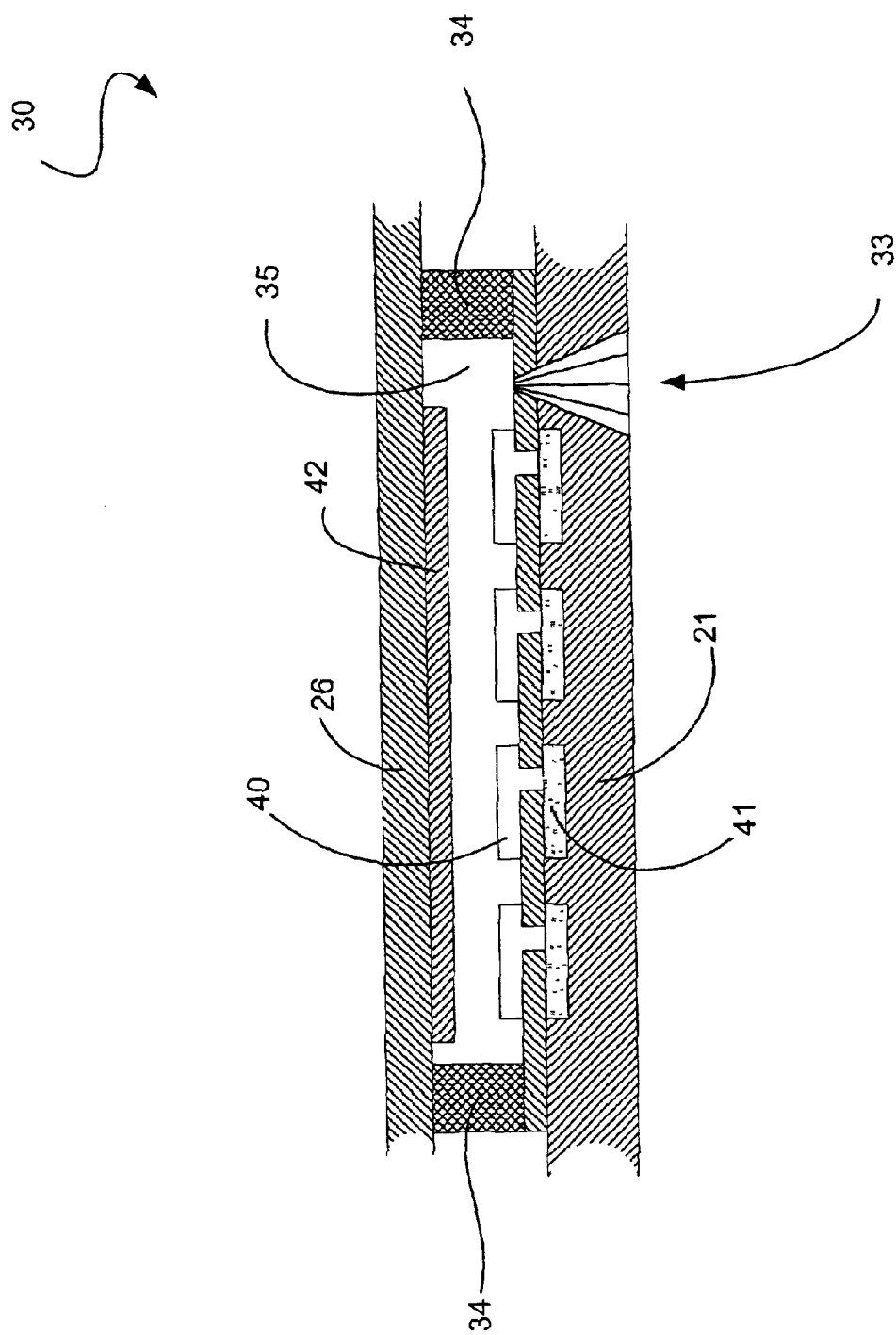
FIG. 5 depicts a cross sectional view of an lcmd of FIG. 4.

With additional reference to FIGS. 4 and 5, FIG. 3 depicts a flow chart illustrating a method of manufacturing lcmds of the present invention. Lcmds are formed using two substrates. In one embodiment, the first substrate is a silicon wafer 21 (less than 1 mm thick) on which many (typically hundreds) of ICs are formed. Each IC 22 includes a large number (typically about half a million) of active pixels comprising electrodes 40 driven by corresponding switching elements 41. The thickness of each substrate may vary according to the application for which the lcmds will be used. The second substrate is transparent and is typically a thin glass wafer 26 having the transparent electrodes 42 of a corresponding number of lcmds. The transparent electrodes 42 are made from a transparent conductive material such as indium-tin oxide.

Fill holes 33 are created in one of the wafers as indicated in step 3A. The fill holes 33 are carefully positioned so as to provide access to the chamber 35 of each lcmd 30 without damaging the ICs 22 or the display area of the lcmd 30. For example, a fill hole 33 may be positioned as illustrated in FIGS. 4 and 5. The fill holes 33 may be created in either the glass wafer 26 or the silicon wafer 21. If the fill holes 33 are to be in the glass wafer 26, then they may be created using a glass drilling tool such as a laser device or a rotary drill. However, the fill holes 33 are preferably created in the silicon wafer 21 using an anisotropic etch. The anisotropic etch creates a funnel-shaped fill hole 33 in the silicon wafer 21 such that the opening in the inner surface of the silicon wafer 21 is smaller than the opening in the outer surface, as illustrated in FIG. 5. The anisotropic etch helps to more precisely place the fill holes 33 in the desired areas of the inner surface of the silicon wafer 21.

After the fill holes 33 are created, wafers 21 and 26 are joined as indicated in step 3B. This step typically involves applying a sealant material around each IC 22 and then joining the wafers to form lcmd units 30. The lcmd units 30 are then filled with liquid crystal material via the fill holes 33, as indicated in step 3C. The filling is preferably achieved using a standard vacuum filling technique whereby lcmds are placed in a vacuum chamber (not shown) in which air pressure is subsequently reduced; the lcmd units are then lowered into a bath of liquid crystal material and the pressure in the vacuum chamber is reasserted such that the pressure difference between the lcmd chambers 35 and their surroundings forces the liquid crystal material into the lcmd chambers 35 through the fill holes 33. Other filling methods may also be used, such as, for example, injecting or pouring the liquid crystal material into the lcmds through their respective fill holes 33. These alternative filling methods may be facilitated by the creation of outlet holes in a substrate for allowing the air inside an lcmd chamber 35 to escape while the lcmd chamber 35 is being filled with liquid crystal material. After the lcmds are filled, the fill holes 33 (and any outlet holes) are sealed using a sealing object, such as a plug, or a sealing material such as glue, epoxy, or solder, as indicated in step 3D.

The lcmds are then tested as indicated in step 3E. Since the lcmds are still part of the same substrates and are still physically connected, they are easily handled during testing. Each row or column of lcmds may share the same testing signal(s) as illustrated in FIG. 4 and discussed in the related description below. Lcmds that appear to be defective are marked using, for example, an ink marker, so that they may be identified and disposed of at a later time. After the lcmds are tested, they are separated along scribe lines 36 (as indicated in step 3F) using, for example, a scribe and break process as discussed above. By following the above described steps, the debris caused by the scribe and break process should not affect the quality or performance of the lcmds since they are filled and sealed before debris are generated.

It should be noted that in some implementations, steps 3A–3F may occur out of the order illustrated in FIG. 3. As a non-limiting example, step 3B may occur before step 3A. Furthermore, each one of steps 3A–3F may comprise substeps.

FIG. 4 is a top view of an example lcmd substrate assembly formed by the silicon wafer 21 and the glass wafer 26 before being divided into individual lcmds. For illustration purposes only, the silicon wafer 21 is shown to contain only 9 ICs. Typically, however, such a silicon wafer would contain hundreds of ICs. Each IC, such as IC 22, is surrounded by a sealant wall 23 and is resistively connected to other ICs and to a testing terminal, such as testing terminal 25, located on the silicon wafer 21 and used for receiving a testing signal. A glass wafer 26 covers the ICs and is joined to the silicon wafer via the sealant walls 23 that surround the ICs. The glass wafer 26 is layered with typically one transparent electrode 42 (FIG. 5) per lcmd. Transparent electrodes 42 are made from a transparent material such as indium-tin oxide. Parallel paths, such as paths 28 and 29 are used to reduce the impact of open circuits during testing. The glass wafer 26 is placed over the silicon wafer in such a way as to not cover the testing terminals on the silicon wafer.

FIG. 5 is a cross sectional view of a simplified version an lcmd 30 of FIG. 4. Lcmd 30 contains an lcmd chamber 35 that is filled with liquid crystal material through fill hole 33. The filling is preferably performed in a vacuum chamber as discussed above. After the lcmd chamber 35 is filled, the fill hole 33 is sealed using a sealing object, such as a plug, or a sealing material such as glue, epoxy, or solder. The filling and testing processes of this invention are easier than the traditional filling and testing processes since lcmds do not have to be individually handled. Instead, lcmds 30 are filled and tested before they are separated. Furthermore, fewer defects are caused during the new filling process since no debris from the scribe and break process are pulled into the lcmds.

FIG. 6 illustrates the testing of an lcmd in accordance with an embodiment of the present invention. For illustration purposes only, very few pixel electrodes 40 and corresponding switching elements 41 are shown. However, each lcmd tested may contain hundreds of thousands or even millions of pixels. After the lcmds are filled and sealed, but before they are separated, an electric signal is sent to one or more ICs 22 through a testing terminal, such as testing terminal 25 (FIG. 4). The testing signal is routed through a connection 54 to a switching element 53 that is fabricated in or forms part of the IC 22. Each connection, such as connections 54 and 56, may be resistive and/or may incorporate a resistive element. The testing signal causes the switching element 53 to connect the pixel electrodes 40 to a grounding terminal 52 via respective switching elements 41. The grounding terminal 52 may be located on the silicon wafer and may be grounded through a connection that is routed between scribe lines.

With all the pixel electrodes 40 grounded, a corresponding transparent electrode 42 (FIG. 5) on the glass wafer 26 may be driven with varying voltages to create an all "black", an all "white", and/or an intermediate gray display. Optical testing equipment such as, for example, a specialized camera, can then be used to evaluate the lcmd's performance in response to the testing signals. The optical testing equipment tests to see if the lcmd produces a non-uniform image. An lcmd image may be non-uniform for various reasons such as, for example, the presence of debris in the lcmd or incomplete liquid crystal filling. An lcmd that produces a non-uniform image can be marked using, for example, an ink marker, so that it can be disposed of after the lcmds are separated. The above described approach eliminates the difficulties associated with handling separate lcmds during testing as well as the unnecessary cost associated with packaging defective units.

It should be emphasized that the figures described above and attached hereto and the items shown therein are not necessarily drawn to scale or accurately proportioned, but rather, they represent simplified illustrations that help to clearly set forth the principles of the invention. Furthermore, the above-described embodiments of the present invention are merely possible examples of implementations setting forth a clear understanding of the principles of the invention. Many variations and modifications may be made to the above-described embodiments of the invention without departing substantially from the principles of the invention. All such modifications and variations are intended to be included herein within the scope of the disclosure and present invention and protected by the following claims.

We claim:

1. A method of manufacturing a plurality of liquid crystal micro displays (lcmds), said method comprising:
   providing a substrate having the plurality of lcmds interconnected to one another;
   creating a plurality of holes in the substrate, wherein each of the plurality of holes extends through the substrate from a major surface thereof into a respective one of the lcmds;
   causing liquid crystal material to flow through said plurality of holes, and to fill spaces within said plurality of lcmds; and
   sealing said plurality of holes.

2. The method of claim 1, further comprising:
   testing said plurality of lcmds after sealing said plurality of holes.

3. The method of claim 2, further comprising:
   separating said plurality of lcmds from each other after testing said plurality of lcmds.

4. The method of claim 1, wherein said substrate is a semiconductor substrate.

5. The method of claim 4, wherein the semiconductor substrate comprises an integrated circuit.

6. The method of claim 4, wherein the semiconductor substrate is part of a silicon wafer.

7. The method of claim 1, wherein said substrate comprises glass.

8. The method of claim 1, wherein said plurality of holes are sealed using a sealant material selected from a group consisting of glue, epoxy, and solder.

9. A method of manufacturing a plurality of liquid crystal micro displays (lcmds) comprising:
   testing said plurality of lcmds while they are connected to each other and to a connection for conducting a test signal; and
   separating said plurality of lcmds from each other after said testing.

10. The method of claim 9, wherein each of said plurality of lcmds comprises a semiconductor substrate having an integrated circuit and a glass substrate having a transparent electrode.

11. The method of claim 10, wherein said integrated circuit comprises electrodes.

12. The method of claim 11, wherein said testing includes causing a voltage difference between the integrated circuit electrodes and the transparent electrode.

13. The method of claim 12, wherein said testing includes determining whether each of the plurality of lcmds produces a uniform image.

14. A liquid crystal micro display (lcmd) assembly comprising:
   a first substrate of the lcmd assembly;
   a second substrate of the lcmd assembly, the second substrate having a pair of opposed major surfaces and comprising a hole extending through the second substrate between the major surfaces; and
   liquid crystal material that is located between the first substrate and the second substrate of the lcmd assembly.

15. The lcmd assembly of claim 14, wherein said hole can be used for filling the lcmd with liquid crystal material.

16. The lcmd assembly of claim 14, wherein the second substrate is a semiconductor substrate comprising an integrated circuit.

17. The lcmd assembly of claim 14, wherein the second substrate comprises glass.

18. The lcmd assembly of claim 14, wherein said lcmd assembly is physically connected to other lcmd assemblies.

* * * * *